(12) United States Patent
Ogle

(10) Patent No.: US 6,813,649 B2
(45) Date of Patent: Nov. 2, 2004

(54) ONBOARD USER MANUAL FOR A PRINTING CAPABLE DEVICE

(75) Inventor: Angela Kay Ogle, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 10/166,472

(22) Filed: Jun. 10, 2002

(65) Prior Publication Data

US 2003/0229737 A1 Dec. 11, 2003

(51) Int. Cl.[7] .............................................. G06F 3/00
(52) U.S. Cl. .................... 710/8; 710/5; 710/12; 710/33; 710/62; 710/65; 712/405; 713/1; 713/100
(58) Field of Search ........................... 710/1, 5, 8, 62, 710/65, 67, 6, 12, 18, 19, 33, 100; 712/405; 713/1, 100, 2; 711/170; 345/156

(56) References Cited

U.S. PATENT DOCUMENTS

| | | | | |
|---|---|---|---|---|
| 5,446,557 A | * | 8/1995 | Haze | 358/444 |
| 5,550,958 A | * | 8/1996 | Hattori | 358/1.16 |
| 6,198,809 B1 | * | 3/2001 | Disanto et al. | 379/93.23 |
| 2002/0032707 A1 | * | 3/2002 | Takeoka | 707/530 |
| 2002/0141803 A1 | * | 10/2002 | Arnold et al. | 400/103 |
| 2003/0048469 A1 | * | 3/2003 | Hanson | 358/1.14 |
| 2003/0110412 A1 | * | 6/2003 | Neville | 714/25 |
| 2003/0110413 A1 | * | 6/2003 | Bernklau Halvor | 714/25 |

FOREIGN PATENT DOCUMENTS

| | | | | | |
|---|---|---|---|---|---|
| JP | 62097874 A | * | 5/1987 | | B41J/29/00 |
| JP | 03188525 A | * | 8/1991 | | G06F/9/06 |
| JP | 04114272 A | * | 4/1992 | | G06F/15/20 |
| JP | 08171589 A | * | 7/1996 | | G06F/17/60 |
| JP | 11212843 A | * | 8/1999 | | G06F/12/00 |
| JP | 11316660 A | * | 11/1999 | | G06F/3/12 |
| JP | 200308495 A | * | 3/2003 | | G06F/3/00 |

* cited by examiner

*Primary Examiner*—Jeffrey Gaffin
*Assistant Examiner*—Angel L. Casiano

(57) ABSTRACT

A printing capable device includes a printing mechanism for printing on a printable medium and an onboard user manual storage device communicating with the printing mechanism and storing an onboard user manual. The onboard user manual storage device sends the onboard user manual to the printing mechanism and the printing mechanism prints at least a portion of the onboard user manual upon a predetermined event.

12 Claims, 4 Drawing Sheets

ONBOARD USER MANUAL FOR A PRINTING CAPABLE DEVICE

FIELD OF THE INVENTION

The present invention relates generally to an onboard user manual, and more particularly to an onboard user manual for a printing capable device.

BACKGROUND OF THE INVENTION

Computers and computerized devices are very popular and are widely used for data manipulation, data storage, and data presentation. One aspect of a computer's usefulness is the ability to generate a printed output through a printer. The printed output may be used for documentation, sharing of information, etc. Therefore, a common and frequent computer use is the printing out of any manner of reports, papers, graphs, charts, pictures, etc. Consequently, printers are heavily used, both at home and in institutional settings, such as schools, businesses, etc.

As a result of widespread use and high demand, printers are becoming increasingly powerful and flexible. The drawback to this increasing printing power and flexibility is the increasing knowledge required by users to properly and fully use a printer. Therefore, it is a common practice to provide some form of user manual with a printer.

One prior art approach is a printed user manual that is typically provided with each new printer. A printed user manual is very useful and powerful. The printed manual allows the user to repeatedly refer back to particular sections.

However, a printed user manual has several drawbacks. Printing costs are significant and therefore the printed user manual is relatively expensive. Obtaining the printed user manual will require additional lead time before shipping. Extra cost and manpower are required for the requisite handling and packing. In addition, a printed manual may be later misplaced or lost by the user. The user may have difficulty in obtaining a replacement, and such replacement may entail a significant delay.

Another prior art approach, and one that is becoming increasingly popular, is the provision of a user manual on a compact disc (CD). A CD user manual is small and easy to ship, and is more convenient for the manufacturer than a bulky printed user manual. In addition, an electronic version on CD may be easily updated over successive versions of a printer.

However, a CD user manual has drawbacks similar to a printed user manual in that it must be packed with a printer at the factory, and can get misplaced, lost, or damaged over time. In addition, the user must either load the CD in order to read the contents, or must print out part or all of the user manual. This may require additional delay and frustration on the part of the user. Moreover, the user will still have difficulty in obtaining Ea replacement, and such replacement may entail a significant delay.

Therefore, there remains a need in the art for improvements in user manuals for printing capable devices.

SUMMARY OF THE INVENTION

A printing capable device comprises a printing mechanism for printing on a printable medium and an onboard user manual storage device communicating with the printing mechanism and storing an onboard user manual. The onboard user manual storage device sends the onboard user manual to the printing mechanism and the printing mechanism prints at least a portion of the onboard user manual upon a predetermined event.

DETAILED DESCRIPTION

Figure 1:
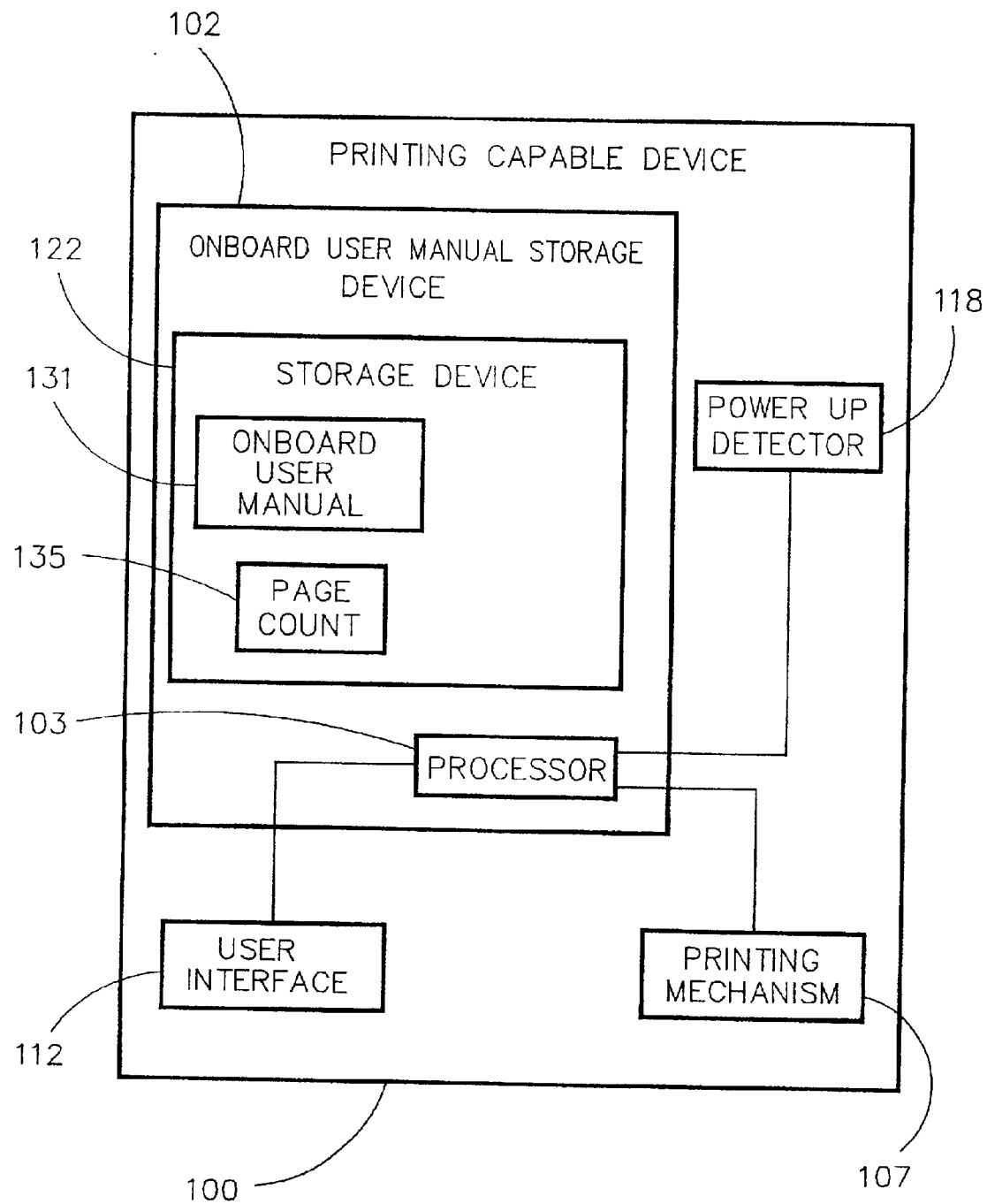
FIG. 1 is a schematic of a printing capable device according to one embodiment of the invention.

FIG. 1 is a schematic of a printing capable device 100 according to one embodiment of the invention. The printing capable device 100 may include a printing mechanism 107, a user interface 112, a power-up detector 118, and an onboard user manual storage device 102. The onboard user manual storage device 102 may include a processor 103 and a storage device 122.

The printing capable device 100 may be any manner of printer. Alternatively, the printing capable device 100 may be any device incorporating a printing mechanism, such as for example, a calculator, an adding machine, a fax machine, etc. In one embodiment, the printing capable device 100 comprises a printer including an onboard disk drive, wherein the onboard disk drive may even allow user storage of frequently printed documents, such as forms, etc.

The processor 103 may be any type of general purpose processor. The processor 103 executes a control routine contained in the storage device 122. In addition, the processor 103 receives inputs and conducts operations of the printing capable device 100.

The printing mechanism 107 may be any manner of printing mechanism. For example, the printing mechanism 107 may be a laser printer, an inkjet or bubble jet printer, a mechanical printer such as a daisy wheel or dot matrix printer, a thermal printer, etc.

The user interface 112 may be any manner of user interface capable of accepting user inputs, displaying outputs to the user, or both. The user interface 112 may include any manner of input devices, such as buttons, switches, menus, etc. In addition, the user interface 112 may include any manner of visual output display, such as an LCD screen, a lamp indicator, such as incandescent or LED indicators, or a touch screen, for example. The user interface 112 allows a user of the printing capable device 100 to input printing selections and control operation of the printing capable device 100. In addition, the user interface 112 may display printer selections and operational data. For example, the user interface 112 may display a number of copies to be printed, a size reduction, etc. Moreover, the user interface 112 enables a user to print out the onboard user manual (explained in detail below).

The power-up detector 118 detects a power-up occurrence of the printing capable device 100. The power-up detector 118 may be any manner of available power regulator or reset chip. Whenever the printing capable device 100 experiences a power-up cycle, the power-up detector 118 sends a power-up signal to the processor 103.

The storage device 122 may be any type of digital memory. For example, the storage device 122 may be any type of volatile or non-volatile memory device, including transistor memory or any type of magnetic or optical storage media. In one embodiment, the storage device 122 is a hard drive employing one or more readable magnetic discs. The storage device 122 may store, among other things, an onboard user manual 131 and a page count 135. In addition, the storage device 122 may store software or firmware to be executed by the processor 103.

The onboard user manual 131 may be any combination of text and/or graphics that form a user manual for the printing capable device 100. The onboard user manual 131 may be permanently or temporarily stored in the printing capable device 100. In one embodiment, the onboard user manual 131 may be deleted by the user. In another embodiment, the onboard user manual 131 may not be deleted by the user. For example, the onboard user manual 131 may be stored in any type of non-erasable or non-volatile memory.

The page count 135 is a count of total pages printed. The page count 135 will be a predetermined number, such as zero, for example, when the printing capable device 100 is first powered-up by a purchaser. A predetermined page count number stored in the page count 135 therefore indicates it has not been used (i.e., a power-up at a zero page count may be an initial power-up).

In operation, when the printing capable device 100 is powered-up, the power-up detector 118 and the processor 103 detect the power-up occurrence. The processor 103 may then check the page count 135. If the page count 135 is the predetermined number, the processor 103 may assume that an initial power-up of the printing capable device 100 is occurring. The processor 103 may subsequently prompt the user with a user manual print option. If the user selects the user manual print option, the printing capable device 100 may print all or part of the onboard user manual 131 (using the printing mechanism 107). The processor 103 retrieves the onboard user manual from the storage device 122 and sends it to the printing mechanism 107 for printing.

The user may optionally select and print only a portion of the onboard user manual, in order to reduce the printing time and/or to conserve paper. The selection may be accomplished through appropriate manipulation of the user interface 112. For example, the user interface 112 may be manipulated to select a page number range, a section, or a topic of the onboard user manual.

Figure 2:
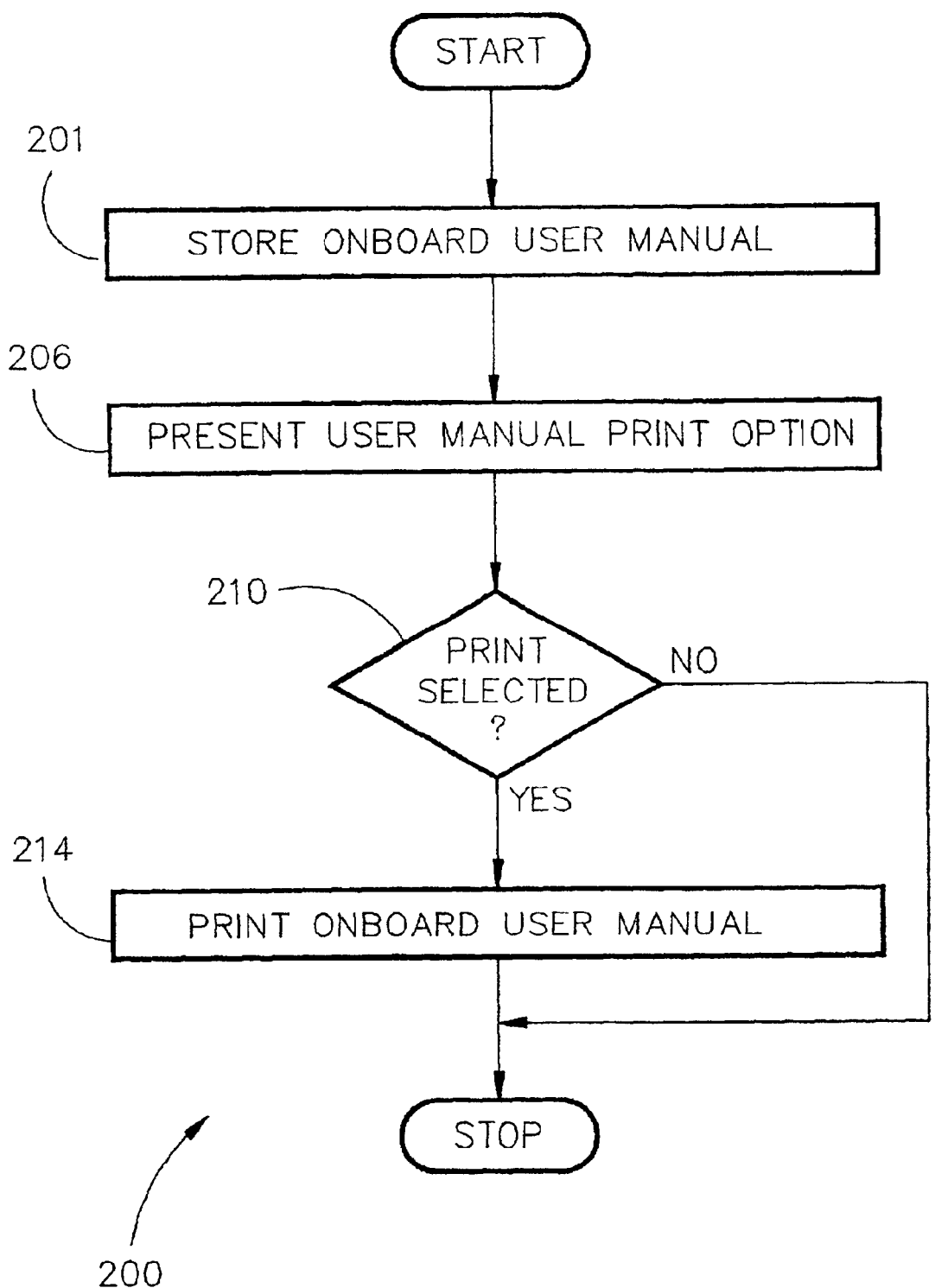
FIG. 2 illustrates, in flowchart form, a printing operation of an onboard user manual during normal operation, according to another embodiment of the invention.

FIG. 2 illustrates, In flowchart form, a printing operation 200 of an onboard manual during normal operation, according to another embodiment of the invention. In this embodiment, a user manual print option may be periodically or persistently presented to the user during operation of the printing capable device 100. For example, the user manual print option may be presented whenever the printing capable device 100 is in a powered-up state. The presentation may include any manner of menu, input button, etc., such as in the user interface 112. The ability to print the onboard user manual may be very helpful when multiple users are using a common printing capable device 100, and may additionally be advantageous over time when the originally printed onboard user manual at the initial power-up may have been lost, misplaced, destroyed. etc.

In block 201, an onboard user manual is stored in the storage device 122 of the printing capable device 100, such as in a digital memory or hard drive, for example. In one embodiment of the printing capable device 100, the onboard user manual 131 may be electronically downloaded into the storage device 122 through an available input/output (I/O) port, via an infrared (IR) port, etc. This may be done at the factory, or may be later added to a printing capable device 100 by a dealer or service shop.

In block 206, a user manual print option is presented to the user of the printing capable device 100. This may be in the form of a graphics message on user interface 112, may be a light indicator with accompanying text, may be part of a menu, etc.

In decision block 210, the printing capable device 100 determines whether a user has selected the user manual print option. If the user has not, control is terminated; otherwise control is transferred to block 214.

In block 214, all or part of the onboard user manual is printed. Therefore, the user may obtain a copy of the user manual.

Figure 3:
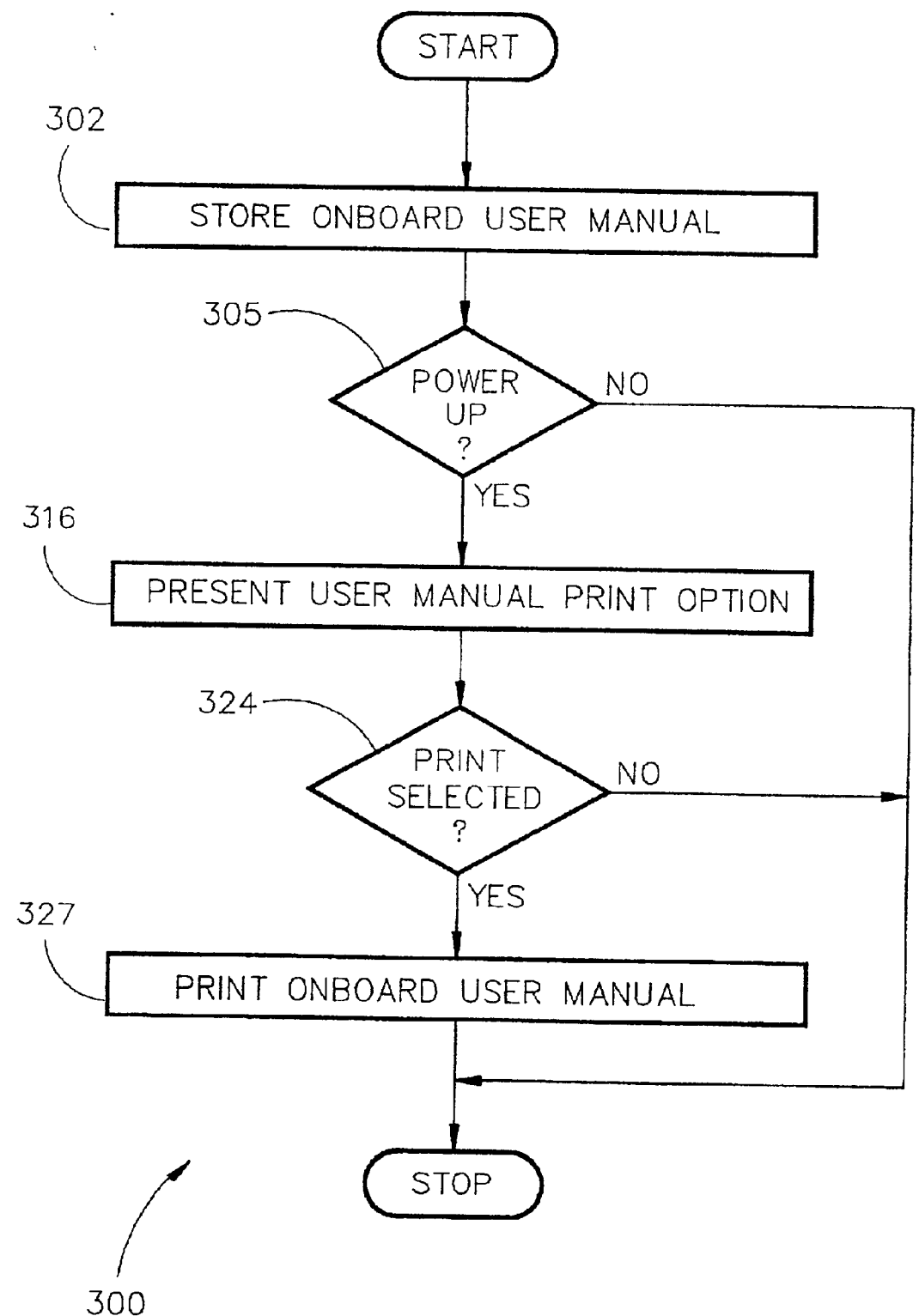
FIG. 3 illustrates, in flowchart form, a printing operation of an onboard user manual upon a power-up occurrence, according to yet another embodiment of the invention.

FIG. 3 illustrates, in flowchart form, a printing operation 300 of an onboard user manual upon a power-up occurrence, according to yet another embodiment of the invention, This may include presenting the user manual print option at every power-up occurrence. This embodiment does not require the page count to be checked.

In block 302, an onboard user manual is stored in the printing capable device, as previously discussed.

In decision block 305, the printing capable device 100 determines whether a power-up has occurred. If a power-up has not occurred, control is terminated; otherwise control is transferred to block 316.

In block 316, a user manual print option is presented to the user of the printing capable device 100, as previously discussed.

In decision block 324, the printing capable device 100 determines whether the user has selected the user manual print option. If the user manual print option has not been selected, control is terminated; otherwise control is transferred to block 327.

In block 327, all or part of the onboard user manual is printed, as previously discussed.

Figure 4:
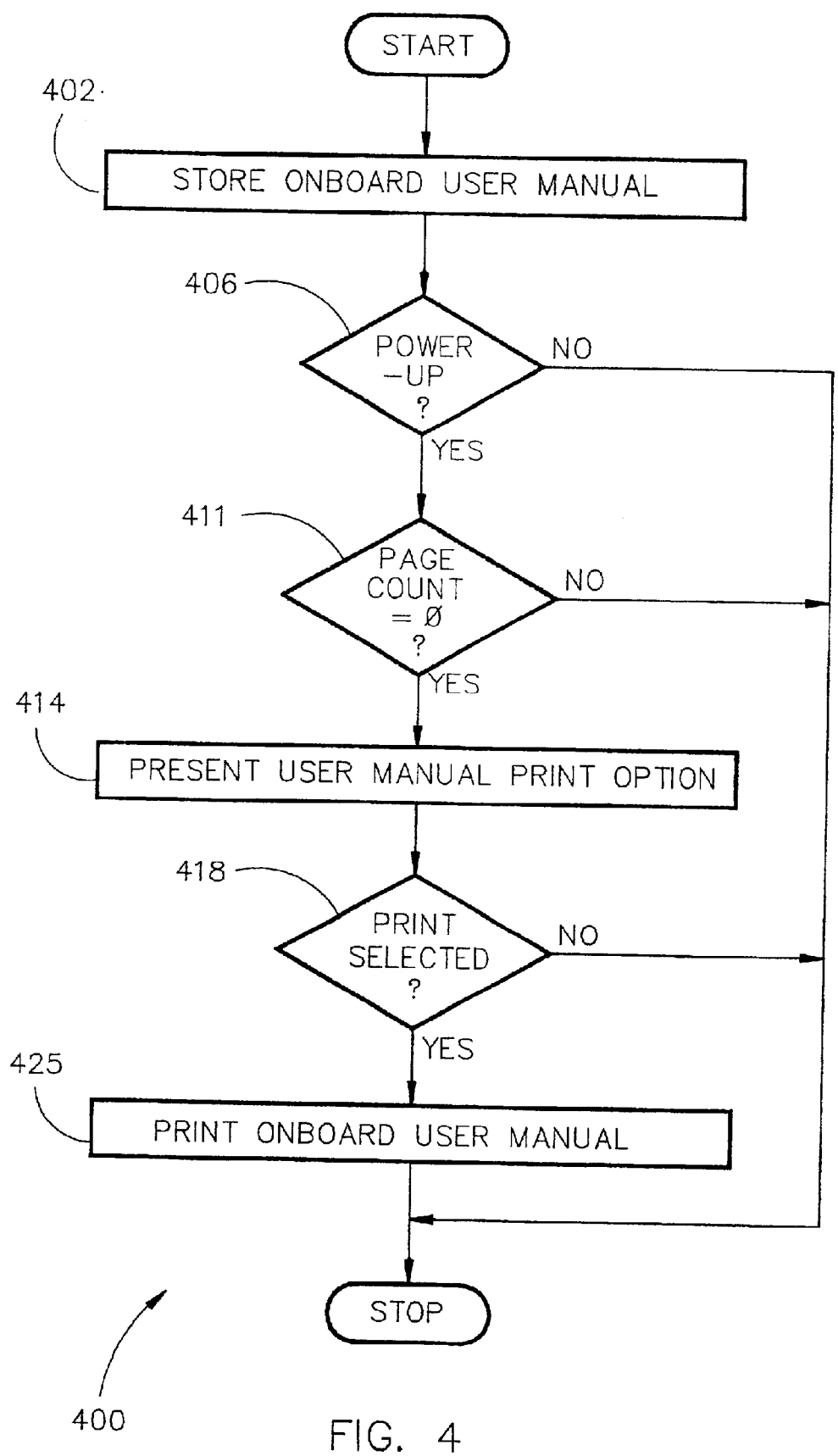
FIG. 4 illustrates, in flowchart form, a printing operation of an onboard user manual upon an initial power-up occurrence, according to yet another embodiment of the invention.

FIG. 4 illustrates, in flowchart form, a printing operation 400 of an onboard user manual upon an initial power-up occurrence, according to yet another embodiment of the invention. An initial power-up occurrence is detected when the page count 135 is the predetermined number at a power-up occurrence. It should be understood that more than one initial power-up occurrence may be detected if no printing occurs at the true initial power-up occurrence.

In block 402, an onboard user manual is stored on the printing capable device 100, as previously discussed.

In decision block 406, the printing capable device 100 determines whether a power-up has occurred. If a power-up has not occurred, control is terminated; otherwise control is transferred to block 411.

In decision block 411, the printing capable device 100 checks a page count 135 and determines if the page count is equal to the predetermined number. If the page count is equal to the predetermined number, the printing capable device 100 determines that an initial power-up has occurred. If the page count 135 is not the predetermined number, control is terminated; otherwise control is transferred to block 414.

In block 414, a user manual print option is presented to the user, as previously discussed.

In decision block 418, the printing capable device 100 determines whether a print user manual option has been selected. If it has not been selected, control is terminated; otherwise control is transferred to block 425. This block therefore waits for a user selection that specifies whether or not to print the user manual. This block may be included to guard against the situation where printing does not occur after the initial power-up (i.e., power is cycled without printing). In such a case, the printing capable device 100 may still prompt the user at the next power-up. Moreover, the printing capable device 100 may continue to do so until printing occurs and the page count 135 is changed from the predetermined number.

In block 425, all or part of the onboard user manual is printed, as previously discussed.

The onboard user manual according to the invention provides several benefits to the user. The user may easily and conveniently obtain a printed user manual. The user manual may be printed at the convenience of the user. In addition, the user can easily and conveniently obtain a replacement user manual at no cost. Moreover, the user may select and print all or a portion of the onboard user manual.

The onboard user manual according to the invention provides several benefits to the manufacturer. The onboard user manual is cheaper and easier to provide than other forms of user manuals. The invention eliminates the need for the printer manufacturer to bear the cost of printing and packing a user manual. In addition, there is less lead time in introducing a new printer. An electronic master version of the onboard user manual is easily updated over revisions of a printing capable device, and the revised version is immediately available. Moreover, the onboard user manual may be provided in printing capable devices where there is no ability of a user to view the stored user manual (i.e., a stored user manual cannot be practically viewed on a printer).

I claim:

1. A printer, comprising:

a printing mechanism;

a processor communicating with said printing mechanism;

a storage device communicating with said processor and storing a user manual for the printer;

wherein said processor is configured to retrieve said user manual from said storage device upon a user selection of a user manual print option and send said user manual to the printing mechanism for printing; and a power-up detector communicating with said processor and providing a power-up signal to said processor upon a power-up occurrence, and wherein said processor presents said user manual print option to a user when said power-up signal is received and prints said user manual if said user manual print option is selected by said user.

2. A printer, comprising:

a printing mechanism;

a processor communication with said printing mechanism;

a storage device communicating with said processor and storing a user manual for the Printer;

wherein said processor is configured to retrieve said user manual from said storage device upon a user selection of a user manual print option and send said user manual to the printing mechanism for printing; and wherein said storage device further stores a page count and wherein upon a power-up occurrence said processor checks said page count and prints said user manual if said page count is a predetermined number.

3. The printer of claim 2, said printer further comprising a user interface capable of presenting said user manual print option to a user and capable of accepting said user selection of said user manual print option, and wherein said printer prints said user manual if said pace count is a predetermined number after a power-up occurrence and if said user manual print option is selected by said user.

4. The printer of claim 2, wherein said storage device comprises a transistor memory.

5. The printer of claim 2, wherein said storage device comprises a magnetic storage medium.

6. The printer of claim 2, wherein said storage device comprises an optical storage medium.

7. A method, comprising the steps of:

storing on board a printer a user manual for the printer;

detecting a power-up occurrence of said printer;

presenting a user manual print option to a user upon said power-up occurrence; and the printer printing said user manual if said user manual print option is selected by said user.

8. A method, comprising the steps of:

storing on board a printer a user manual for the printer;

detecting a power-up occurrence of said printer;

checking a page count stored in said printer upon said power-up occurrence;

presenting a user manual print option to a user if said page count is a predetermined number and the printer printing said user manual if said user manual print option is selected by said user.

9. A printer, comprising:

a printing mechanism;

a processor communicating with said printing mechanism;

a storage device communicating with said processor and storing a user manual for the printer and page count for the printer; and wherein said processor is configured to, upon a printer power-up, check said page count and if said page count is a predetermined number representing an initial printer power-up, present a user manual print option.

10. The printer of claim 9, wherein the processor is further configured to retrieve said user manual from said storage device upon a user selection of said user manual print option and send said user manual to the printing mechanism for printing.

11. A method, comprising the steps of:

storing on board a printer a user manual for the printer;

detecting a printer power-up;

checking a page count stored in said printer upon said printer power-up; and presenting a user manual print option to a user if said page count is a predetermined number representing an initial printer power-up.

12. The method of claim 11, further comprising the printer printing said user manual if said user manual print option is selected by said user.

* * * * *

UNITED STATES PATENT AND TRADEMARK OFFICE
CERTIFICATE OF CORRECTION

PATENT NO.   : 6,813,649 B2
DATED        : November 2, 2004
INVENTOR(S)  : Angela Kay Ogle It is certified that error appears in the above-identified patent and that said Letters Patent is hereby corrected as shown below:

Column 1,
Line 57, delete "Ea" and insert therefor -- a --.

Column 3,
Line 62, after "destroyed" delete "." and insert therefor -- , --.

Column 4,
Line 20, after "invention" delete "," and insert therefor -- . --.

Column 5,
Line 59, delete "Printer;" and insert therefor -- printer; --.

Column 6,
Line 7, delete "pace" and insert therefor -- page --.
Line 31, after "number" insert -- ; --.

Signed and Sealed this

Thirtieth Day of August, 2005

JON W. DUDAS
*Director of the United States Patent and Trademark Office*